United States Patent [19]

Sprague et al.

[11] Patent Number: 5,315,418
[45] Date of Patent: May 24, 1994

[54] TWO PATH LIQUID CRYSTAL LIGHT VALVE COLOR DISPLAY WITH LIGHT COUPLING LENS ARRAY DISPOSED ALONG THE RED-GREEN LIGHT PATH

[75] Inventors: Robert A. Sprague, Saratoga, Calif.; Louis D. Silverstein, Scottsdale, Ariz.; Richard H. D. Bruce, Los Altos, Calif.

[73] Assignee: Xerox Corporation, Stamford, Conn.

[21] Appl. No.: 900,812

[22] Filed: Jun. 17, 1992

[51] Int. Cl.$^5$ .................. G02F 1/1347; H04N 9/31
[52] U.S. Cl. .................... 359/41; 359/50; 359/53; 359/64
[58] Field of Search .............. 359/40, 41, 42, 48, 359/49, 53, 54, 64, 50, 619, 626; 353/31, 34, 122; 345/87, 88, 152; 358/61, 62, 236

[56] References Cited

U.S. PATENT DOCUMENTS

| | | | |
|---|---|---|---|
| 4,416,514 | 11/1983 | Plummer | 350/335 |
| 4,758,818 | 7/1988 | Vatne | 340/701 |
| 4,790,632 | 12/1988 | Miyakawa et al. | 350/347 |
| 4,799,050 | 1/1989 | Prince et al. | 340/765 |
| 4,843,381 | 6/1989 | Baron | 340/784 |
| 4,886,343 | 12/1989 | Johnson | 350/335 |
| 4,917,465 | 4/1990 | Conner et al. | 350/335 |
| 5,052,783 | 10/1991 | Hamada | 359/40 |
| 5,075,798 | 12/1991 | Sonehara et al. | 359/490 |
| 5,083,854 | 1/1992 | Zampolin et al. | 359/40 |
| 5,144,462 | 9/1992 | Otsuka et al. | 359/41 |
| 5,237,435 | 8/1993 | Kurematsu et al. | 359/41 |
| 5,267,062 | 11/1993 | Bottorf | 359/49 |

FOREIGN PATENT DOCUMENTS

| | | | |
|---|---|---|---|
| 58-209716 | 12/1983 | Japan | G02F 1/133 |
| 3261933 | 11/1991 | Japan | H04N 9/31 |
| 4127140 | 4/1992 | Japan | H04N 9/31 |

OTHER PUBLICATIONS

European Search Report, EP 93 30 4640, The Hague, Sep. 27, 1993.
Glenn, et al., Imaging System Design Based on Psychophysical Data, Proceedings of the SID, vol. 26 (1985) pp. 71-78.
Wyszecki and Stiles, Color Science: Concepts and Methods, Quantitative Data and Formulae, John Wiley & Sons, New York, (2nd Ed. 1982), Section 4.3.2, pp. 256-259.
Hamada, H. et al., "Brightness Enhancement of an LCD Projector by a Planar Microlens Array", Society for Information Display Digest, 1992 (place of publication unknown).

*Primary Examiner*—William L. Sikes
*Assistant Examiner*—Tai V. Du
*Attorney, Agent, or Firm*—Judith C. Bares

[57] ABSTRACT

A full color, liquid crystal display device is disclosed having two optical paths, the first for long (red) and medium (green) wavelength regions of the visible light spectrum, and the second for the short (blue) wavelength region of the visible light spectrum. The two optical paths and their properties are nominally matched to the characteristics of the chromatic and luminance processing channels of the human visual system. The two-path device generates two separate, spatially coherent color images using two liquid crystal light valve image forming sources, without the use of color filters typically found in full color displays. The two images are combined by additive spatial superposition to produce a single, full-spectrum, composite color image. In one embodiment, individual red and green light components from an efficient, patterned backlight of individual red and green light emitters are coupled by a light coupling lens array to respective display pixels in the liquid crystal light valve. In another embodiment, red and green light components form a red and green image by passing through two aligned liquid crystal light valves and two color selecting polarizers. A light coupling lens array couples the light from one liquid crystal light valve to the other. Suitable light coupling lens arrays in both embodiments include a SELFOC lens array, a strip lens array, or a microlens array. The composite image may be either directly viewed or optically projected using a conventional projection lens assembly onto an intermediate viewing surface.

19 Claims, 8 Drawing Sheets

TWO PATH LIQUID CRYSTAL LIGHT VALVE COLOR DISPLAY WITH LIGHT COUPLING LENS ARRAY DISPOSED ALONG THE RED-GREEN LIGHT PATH

FIELD OF THE INVENTION

The present invention relates generally to full color display devices, and, more particularly, to a full color display device having improved luminous efficiency and using liquid crystal light valve image forming sources for forming full color images in two optical paths without using light absorbing color filters for generating color. The two optical paths and their properties are nominally matched to the characteristics of the chromatic and luminance processing channels of the human visual system. Color selection is accomplished through the use of color selecting polarizers or a highly efficient, patterned color backlight.

CROSS REFERENCE TO RELATED APPLICATIONS

A concurrently filed and commonly assigned U.S. patent application of Silverstein, et al., U.S. Ser. No. 07/900,872, entitled "Two Path Liquid Crystal Light Valve Color Display", relates to a full color display having two optical paths in which red and green light form an image in a liquid crystal image forming means having a first resolution in one path, and blue light forms an image in a liquid crystal image forming means having a second, lower resolution in the second optical path. A concurrently filed and commonly assigned U.S. patent application of Sprague, et al., U.S. Ser. No. 07/900,813, entitled "Full Color Display With Light Coupling Lens Array", relates to a full color display which optically couples primary color visible light emitters from an efficient patterned color backlight to a matrix of addressable display pixels in an image forming means.

BACKGROUND OF THE INVENTION

Full color information display systems for display of high definition video information and complex pictorial and graphics images must be able to provide high image resolution for precise edge definition and image sharpness; high display and image luminance for maximum image brightness in a variety of display environments; and precise, predictable control over color synthesis and reproduction using the largest color gamut available. For purposes of the discussion herein, the term "full color" display means a display which is capable of producing color from the full spectrum of visible light, and which uses at least three additive or subtractive primary colors to produce the full spectrum.

Direct view, full color visual displays predominantly use an additive color system based on spatial juxtaposition, or spatial proximity, for the production of full color images. A single, full color picture element, or "pixel", of a displayed image is produced by the spatial integration of very small, juxtaposed primary (red, green, and blue) color sub-picture elements, or subpixels. "Pixel" and "image pixel" are defined herein as the smallest information element in a displayed image. The resolution of an image is determined by its pixel density. "Subpixel" and "image subpixel" are defined herein to mean a single primary color element that is used, along with two other primary color elements, to form a color from the full spectrum in an image pixel. Additive spatial proximity color synthesis requires high subpixel density (resolution) because the projected angular subtense of the primary color elements must be encompassed within the spatial integration zones of the human visual system in order for the eye to integrate a set of individual primary color subpixels into the single mixture color to be formed by the image pixel.

A leading display technology for high information content, full color visual displays is backlit liquid crystal display (LCD) technology, and, in particular, active-matrix addressed color liquid crystal display (AMCLCD) technology. Typically, full color liquid crystal displays utilize a matrix of individually addressable liquid crystal light valves (LCLV) with integral red, green, and blue color filters for forming a full color image using the technique of additive spatial juxtaposition.

From the perspective of the display's hardware, each primary color subpixel of an image pixel must be individually controllable for luminance, generally along some range from a minimum of no light to the maximum light the subpixel is capable of producing. Thus, a primary color image subpixel is the equivalent of, and will be referred to herein as a "display pixel". The hardware requirement in additive spatial proximity color synthesis for three "populations" of spatially separated primary color display pixels results in a reduction of available image sampling resolution for a display device of a given size. For the display of large full color images in particular, additive spatial juxtaposition color synthesis alone is generally not an efficient method for generating full color images because of the excessive cost associated with increasing the size of the display in order to achieve high image resolution. In addition, significant losses in display luminance and perceived brightness result from the fact that each of the three primary colors, without regard to its individual contribution to overall luminance or perceived brightness, generally occupies an equal amount of the available, active light emitting surface area of the display.

Another method for generating full color images is based on additive spatial superposition in which a full color image is produced by the spatial registration of separate images, each comprised of typically one primary color, and optically fused into one full color image for viewing by the observer. Such a system is the predominant method used in color projection displays. Typically, three images corresponding to red, green, and blue primary colors are generated, requiring three separate imaging (optical) paths. Because each display pixel is equivalent to an image pixel and is capable of full color and luminance control, and because each of the color images is generated at full spatial resolution, the additive spatial superposition method of color synthesis achieves excellent image resolution and can also achieve relatively high overall luminance and perceived brightness. For these reasons, spatial superposition of separate color images provides a very feasible color synthesis method for producing large full color display images, such as those required in high definition television or comparable visual information display systems.

However, multiple (three or more) optical path, full color, spatial superposition display systems require precisely controlled hardware and optical elements to achieve exact image registration and alignment in order to maintain color purity and image sharpness. In addition, color display systems using projected superimposed images tend to be large, complex, and costly as a result of the separate optical paths and sets of imaging elements needed.

The concurrently filed and commonly assigned U.S. patent application of Silverstein, et al., entitled "Two Path Liquid Crystal Light Valve Color Display" recognizes the deficiencies of each of the two methods of color production and proposes a full color display that takes advantage of psychophysical properties of the human visual system in order to make a full color display which is optically simpler to construct than a three optical path system, and which eliminates some of the critical image alignment problems in three optical path systems. Specifically, the full color display disclosed in Silverstein, et al. generates and displays a composite full color image in two optical paths by combining a red and green color image with a blue color image using additive spatial superposition of the images. In one embodiment, the red and green color image is formed by additive juxtaposition of red and green display pixels in one liquid crystal image forming means, and the blue color image is formed in a second liquid crystal image forming means.

The invention disclosed in Silverstein, et al. utilizes research findings that recognize certain factors about the human visual system. In particular, research has shown that the eye's peak spatial response to blue light occurs at approximately one half the spatial frequency of peak spatial response for red or green light and half again the spatial frequency for achromatic, or luminance, signals, indicating that blue light contributes only a minor amount to image resolution factors such as image shape and spatial detail. As a result, neither the resolution nor the alignment of blue image pixels in an image created by additive spatial superposition is critical to image quality since misalignment is not easily detected by the eye. Conversely, misalignment of red and green images is more easily detected by the eye, imposing a critical registration constraint on the red and green images in three optical path systems. It is also known that the photopic response of the human eye to blue light is low and inefficient, and thus, short wavelength (blue) light provides a much smaller contribution to overall perceived brightness than long (red) and medium (green) wavelength light of the visible spectrum. At the same time, the highest possible luminance contribution of blue light improves the display's maximum luminous output and overall color balance or white point, and achieves a larger and more balanced color gamut.

Silverstein et al. recognized that combining the red and green image forming paths into a single optical path eliminated the need for the critical alignment of those images in the final image formed by superposition. In addition, they recognized that increasing the display pixel size and reducing the resolution of the blue light image would result in an increase in the overall space-average intensity of the short wavelength light contribution, without increasing the intensity of the light source and without reducing the effective image resolution. The separate optical path for short (blue) wavelength light, and the formation of the blue image with a lower sampling density, or resolution, increases the overall perceived image and display brightness, provides a brighter display white point, and provides brighter color rendition for colors having a blue component.

However, once treatment of the blue light has been optimized in this manner, the overall perceived brightness of the full color image and the luminous efficiency of the two optical path display device is largely determined by the luminous efficiency of the optical path which handles the production of the red and green image. In general, when a display operates in transmissive mode, display and image luminance, and luminous efficiency are determined by both the luminance of a backlight, placed behind the display, and the transparency of the display. These factors, in turn, affect the color fidelity of the display. Thus, more efficient generation of the red and green radiation emanating from the backlight in the red and green optical path and more efficient control of the radiation through the red and green image forming light valve afford the viable opportunities for maximizing the overall perceived brightness and luminous efficiency of the entire display.

As described by Silverstein, et al., the red and green image in the two path display is produced in one embodiment using a mosaic of individual (narrow band) red and green color filters arranged on a single layer. As is generally known in the art, such a color filter mosaic is typically positioned immediately adjacent to the liquid crystal panel such that each individual color filter is in registration with a respective individual display pixel and transmits only the desired portion of broadband (white) light while absorbing all other wavelengths. In the case of the red and green optical path, the backlight is a yellow light source with associated collimating optical elements for controlling the spatial distribution of the light before it enters the red and green image forming light valve.

The absorptive red and green color filter mosaic, however, is a highly inefficient use of the energy contained in the yellow light source, since it absorbs a substantial amount of the incident light, as much or more than two-thirds, during red and green color selection, consequently reducing the luminous efficiency of the red and green optical path.

In another embodiment of the two path full color display disclosed by Silverstein et al., the red and green color filter layer is eliminated, and the red and green image is formed using a pair of aligned liquid crystal image forming sources with a pair of color selecting polarizers. Elimination of the color filter mosaic and use of the two aligned liquid crystal image forming sources and color selecting polarizers eliminates the disadvantages associated with the color filter layer, but introduces a requirement for maintaining the careful alignment of the light rays as they pass through both liquid crystal image forming sources. That is, in order to achieve good color fidelity and maintain high overall brightness in the red and green optical path, the yellow light must be carefully channeled to pass through both liquid crystal image forming sources so that substantially all the light that passes through each individual display pixel of the first liquid crystal image forming means also passes through the respectively aligned display pixel of the second liquid crystal image forming means and through the color selecting polarizers without distortion. Substantially no stray light must pass through adjacent pixels. A conventional optical element or set of optical elements is provided for substantially collimating the yellow light as it passes through both liquid crystal image forming sources. Those skilled in the art are aware that substantially collimating the light through the liquid crystal light valves has a tendency to reduce the amount of source light collected and available to the liquid crystal light valves for image formation, thus reducing the overall brightness.

Further complicating the requirement for carefully channeling the yellow light through respectively aligned display pixels is the structure of the display pixels themselves. The transparency of a display is normally reduced by the amount of inactive area in the active matrix addressing elements comprising the transparent conductive electrode, i.e., the presence of the opaque active elements and interconnect within the display pixel. Since the transparent conductive electrode may comprise an area from about thirty percent (30%) to about eighty percent (80%) of the area of each display pixel, depending on the display application, considerable display luminance may be lost by light which is blocked by the opaque addressing elements and which never enters the transparent portion of the pixel. Conventional light collimating techniques do not address the problem of light blocked by the opaque portion of the display pixel.

SUMMARY OF THE INVENTION

What is needed, therefore, is a two path, full color liquid crystal display with an efficient optical configuration in the red and green optical path for achieving the maximum light throughput and luminous efficiency of the display, in order to produce a bright image capable of accurate and complete color control along the red and green colorimetric axis. The present invention improves the overall perceived brightness and luminous efficiency of a two path liquid crystal full color display by efficiently generating and controlling the radiation emanating from the backlight in the red and green optical path.

Accordingly, there is provided a liquid crystal color display for generating and displaying a full color image in two optical paths without the use of color filters typically used in full color devices. The two path color display comprises first light source means for generating red and green visible light components for the first optical path. The first light source means has a plurality of individual red and green visible light emitters arranged spatially on a light emitting surface of the light source means so that light from each of the visible red and green light emitters forms a mixture color to the human eye through the technique of additive spatial juxtaposition. First liquid crystal image forming means receives the visible red and green light from the first light source means along the first optical path and forms a red and green color image in a matrix of individually addressable display pixels. Modulation means, associated with the first liquid crystal image forming means modulates the amount of visible red and green light received from the first light source means. Light coupling lens array means, disposed between the first light source means and the first image forming means, optically couples the visible light from each emitter to a respective one of the display pixels in the first liquid crystal image forming means, and has optical properties for collecting substantially all of the visible light from each emitter and for focusing a real image thereof in the respective display pixel. Second light source means provides a substantially collimated blue light component along a second optical path to second liquid crystal image forming means, which forms the blue color image. Image combination means receives the red and green color image and the blue color image from the respective first and second optical paths, and combines the two images by additive spatial superposition into a composite full color image. Image display means then receive and display the composite full color image, either as a direct view, display, or by means of a conventional projection lens assembly to a viewing surface, in such a manner as to be visible to a human observer.

In another aspect of the present invention, the first liquid crystal image forming means includes a first linear polarizer, disposed between the first light source means and the first liquid crystal image forming means, for polarizing in a first polarization plane the visible light emitted from each emitter before the light enters the first liquid crystal image forming means. The first liquid crystal image forming means also includes nematic liquid crystal material in a twisted configuration, capable of causing a rotation of the first polarization plane of the visible light in each display pixel when the modulation means energizes the display pixel. A second linear polarizer, disposed between the first liquid crystal image forming means and the image combination means, controls the optical transmission of the visible light passing from the first liquid crystal image forming means to the image combination means according to the rotation of the first polarization plane of the light.

In accordance with another embodiment of the present invention, there is also provided a liquid crystal color display for generating and displaying a full color image in two optical paths in which the first liquid crystal image forming means for forming the red and green image utilizes color selecting polarizers for selecting colors along the red to green colorimetric axis. Specifically, in this second embodiment, light source means provides a substantially collimated red light component and a substantially collimated green light component along the first optical path. The first image forming means includes liquid crystal light intensity controlling means which modulates the light intensity of a first plurality of individually addressable display pixels of the red and green image by selectively energizing each pixel according to the red and green image to be formed. Liquid crystal color selection means selects color in each of a second plurality of individually addressable display pixels of the red and green image along a red to green colorimetric axis. The liquid crystal light intensity controlling means and the liquid crystal color selection means are substantially aligned with respect to one another along the first optical path. Light coupling lens array means, disposed between the liquid crystal light intensity controlling means and the liquid crystal color selection means, collects substantially all of the visible light from each display pixel of the liquid crystal light intensity controlling means and focuses a real image thereof in the respectively aligned display pixel of the liquid crystal color selection means. At least two color selecting polarizers select quantities of the red and green light components, emanating from each of the second plurality of display pixels, according to the red and green image to be formed. The light source means also provides a substantially collimated blue light component along the second optical path. Second liquid crystal image forming means receives the collimated blue light component and forms a blue color image. As with the first embodiment, image combination means receives the red and green color image and the blue color image from the respective first and second optical paths for combining by additive spatial superposition into a composite full color image, and image display means receive and display the composite full color image in such a manner as to be visible to a human observer.

Suitable light coupling lens arrays in both embodiments include a gradient index lens array, a strip lens array, or a microlens array. The gradient index lens array is a two dimensional array of light conducting rod lenses, with each rod lens having a graded refractive index distribution. The strip lens array is a plurality of two-dimensional planar arrays of lenslets, disposed adjacent to each other on a transparent substrate layer. Each planar array of lenslets is in substantial alignment with adjacent planar arrays of lenslets. The microlens array is a two-dimensional planar array of microlenses disposed on a transparent substrate layer. Each microlens in the array is approximately the size of a display pixel of the first image forming means and is spatially arranged with other microlenses on the substrate layer so that one microlens is in substantial alignment with one visible light emitter, in the first embodiment, or with one display pixel in the second embodiment.

The novel features that are considered characteristic of the invention are set forth with particularity in the appended claims. The invention itself, however, both as to its organization and method of operation together with other advantages thereof will best be understood from the following description of the illustrated embodiments when read in connection with the accompanying drawings wherein like numbers have been employed in the different Figures to denote the same parts.

BRIEF DESCRIPTION OF THE DRAWINGS

FIGS. 7A, 7B, and 7C illustrate display pixel resolutions for the images formed in each optical path in the illustrated embodiments of the two-path liquid crystal light valve color display of the present invention.

Figure 1:
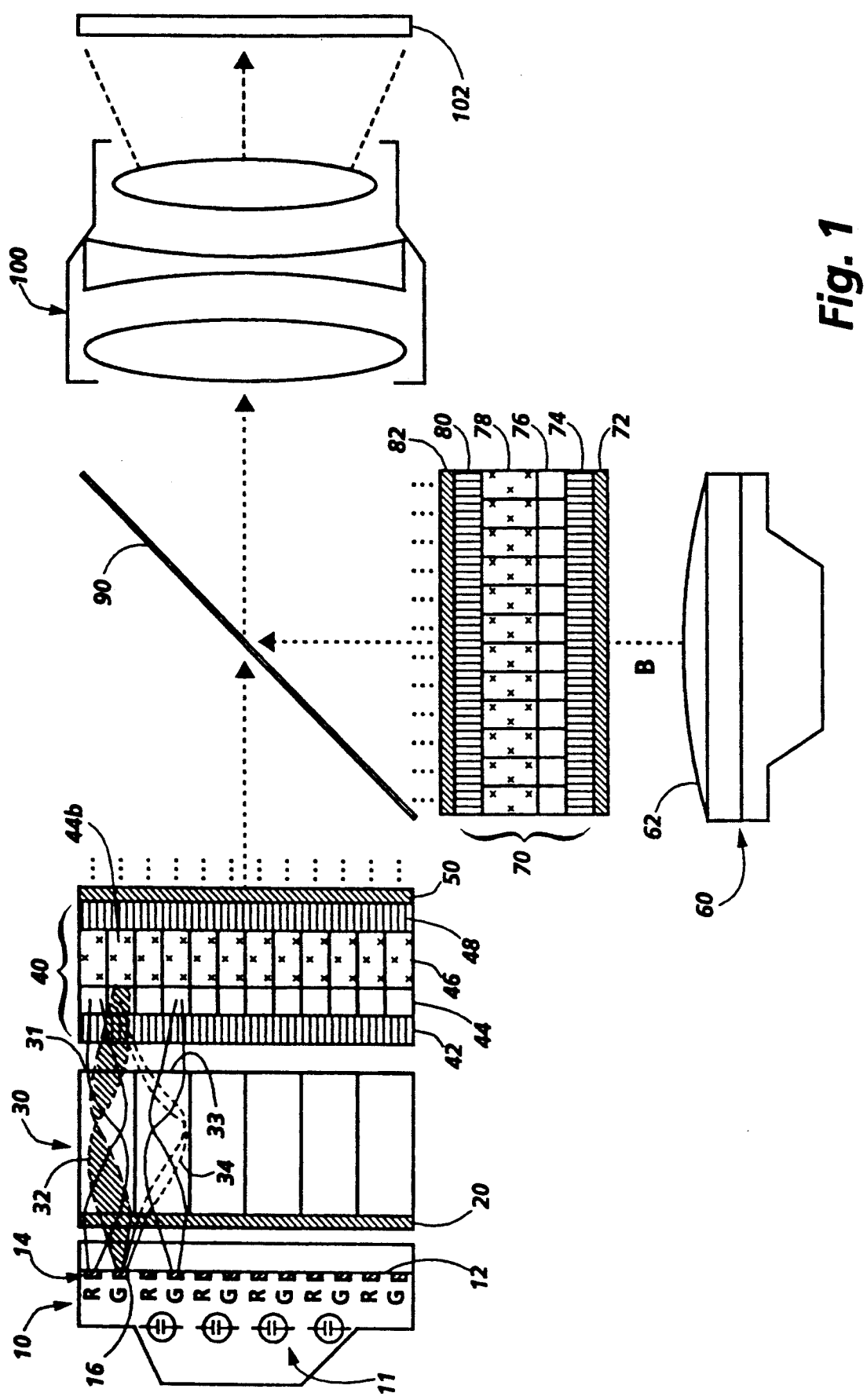
FIG. 1 is an optical schematic view of an embodiment of the two-path liquid crystal light valve color display of the present invention having a patterned red and green light source and a light coupling lens array.

While the present invention will be hereinafter described in connection with preferred embodiments, it will be understood that it is not intended to limit the invention to those embodiments. On the contrary, it is intended to cover all alternatives, modifications and equivalents as may be included within the scope of the invention as defined by the appended claims.

DETAILED DESCRIPTION OF THE INVENTION

References in the description which follows and in the claims, to "in front of" and "behind" locations of components, and to the "front" and "rear" surfaces of components of the display of the present invention are defined with respect to the orientation of the human observer of the full color image. Thus, for example, with reference to FIG. 1, light coupling lens array 30 is located in front of light source 10 and behind twisted nematic liquid crystal (hereafter, TNLC) cell 40. Similarly, entrance polarizer 20 may be bonded on the rear surface of light coupling lens array 30 or on the rear surface of transparent substrate 42, while active electrode matrix 44 may be fabricated on the front surface of transparent substrate 42. Light source 60 is positioned behind twisted nematic liquid crystal cell 70.

The display disclosed herein is described as operating in a transmissive, twisted nematic configuration having entrance and exit polarizers, 20 and 50, respectively (FIG. 1), for controlling light transmission therethrough. Those skilled in the art will appreciate, however, that the novel combination of the present invention may be implemented with a variety of liquid crystal materials, such as guest-host type material or phase-change guest-host material, and as those skilled in the art are aware, the type of liquid crystal material used may affect the configuration of the optical components in the display. It is intended that the present invention include any adjustments to the components shown in the figures as are required to accommodate other types of liquid crystal materials.

1. Embodiment of the two path full color display with highly efficient patterned red and green backlight.

a. Operation of the liquid crystal light valve.

FIG. 1 illustrates an embodiment of the two-path liquid crystal color display (LCD) of the present invention in which a red and green image is formed in a first liquid crystal light valve 40 in a first optical path, and a blue image is formed in a second liquid crystal light valve 70 in a second optical path. The red and green image is then combined with the blue image into a full color image for display on a viewing surface 102.

The operation of twisted nematic type liquid crystal cells is well known in the art, and certain components of twisted nematic liquid crystal (hereafter, TNLC) cells 40 and 70, such as the voltage source, have been omitted from the figure. Briefly summarizing, with reference to light propagating through the red and green optical path, entrance polarizer 20 linearly polarizes the red and green light emitted from light source 10 in a first polarization orientation. TNLC cell 40 varies the rotation of the axis of polarization of the polarized light to a second polarization orientation. Exit polarizer, or analyzer, 50, then controls the optical transmission of the light, depending on its axis of transmission and on the resulting plane of polarization of the propagating light. For example, TNLC cell 40 may transmit plane polarized red and green light without rotation (zero degrees) of the plane of polarization when fully energized. Then, when TNLC cell 40 is not energized, the plane of polarization is rotated 90° (ninety degrees). For voltages less than a predetermined level which represents the fully energized state, plane polarized light incident upon TNLC cell 40 is rotated through an angle less than 90 degrees, depending on the voltage applied to cell 40.

It is well understood that when polarizers are used on either side of the TNLC cell to control optical transmission, their transmission axes can be either parallel or perpendicular, depending on whether it is desirable that the driven (ON) state of the TNLC cell transmit light or block light, respectively. Hence, if the transmission axis of the exit polarizer 50 is parallel to that of the entrance polarizer 20, the light valve will be dark in the absence of an applied voltage but will become transparent with the application of the voltage. Likewise if the transmission axis of the exit polarizer 50 is perpendicular to that of the incident polarizer 20, the valve will be transparent without a voltage and become dark with the application of a voltage.

TNLC cell 40 consists of a matrix 44 of display pixels that may either be passively addressed via a conventional multiplexing scheme or, preferably, actively addressed with an active matrix of thin film transistors (TFTs) or other conventional "latch-and-hold" circuit elements. Active electrode matrix 44, comprising metalized buses and transparent electrodes, may be fabricated on either transparent substrate 42 or 48, and is shown in FIG. 1 on rear transparent substrate 42. The fabrication of the active matrix for spatially distributing voltages from a voltage source to individual transparent electrodes for the purpose of affecting the optical state of a liquid crystal material is well known in the art. Rear transparent plate 42 encloses a thin film of liquid crystal material 46 between the active matrix 44 and front transparent plate 48. Front transparent plate 48 has a transparent conducting coating (not shown), usually indium tin oxide ("ITO"), on the surface facing the liquid crystal material 46 which serves as an electrode for placing a voltage across the liquid crystal material 46 from the voltage source.

The light passing through liquid crystal material 46 and substrate 48 then passes through conventional linear polarizer 50, located where the red and green light exits TNLC cell 40, and shown in FIG. 1 in front of front transparent plate 48. Linear polarizer 50 serves as the analyzer and enables the control of the light intensity at each red or green display pixel of TNLC cell 40. Entrance polarizer 20 and analyzer 50 are shown mounted as thin film layers, each directly on an adjacent component. Entrance polarizer 20 may be located anywhere between light source 10 and TNLC cell 40; for example, entrance polarizer 20 may be bonded on the rear of front surfaces of light coupling lens array 30 or on the rear surface of transparent substrate 42.

b. Operation of the patterned red and green backlight.

In the embodiment illustrated in FIG. 1, two separate light sources 10 and 60 are used to provide illumination for the display. In the red and green optical path, light source 10 provides light energy having a spectral power distribution in the long (red) and medium (green) wavelength portions of the visible spectrum. Specifically, light source 10 is a high efficiency color emitting backlight source composed of a patterned matrix of individual red and green phosphor emitters in the same spatial configuration as the matrix of display pixels in TNLC cell 40. The use of a light source having a patterned matrix of individual red and green phosphor emitters eliminates the need for light absorbing red and green color filters, thereby providing more light directly into and through TNLC cell 40. Light source 10 includes any suitable energy source for providing either ultraviolet radiation or electrons for exciting the red and green primary colored phosphor emitters to emit visible red and green light.

FIG. 1 illustrates the major components of light source 10. High efficiency light source 10 is preferably a phosphor layer 14 comprising a matrix arrangement of a plurality of discrete red and green phosphor elements, fabricated on reflecting dichroic layer 12. The phosphor layer includes any material that converts energy from an external excitation and, by means of the phenomena of phosphorescence or fluorescence, converts such energy into visible light. Each phosphor element of phosphor layer 14 is excited with ultraviolet radiation, or by energetic electrons, to emit visible radiation in the red or green spectrum, thus forming a matrix of red and green colored light emitters. The plurality of phosphors is preferably arranged into a pattern for producing a single mixture color to the human eye along the red to green colorimetric axis from the eye's integration of the red and green primary colors by additive spatial juxtaposition techniques. The phosphors may be deposited by any of a number of well known processes including settling, screen printing, and photolithography. Each phosphor light emitter of phosphor layer 14 is in substantially aligned registration with a respective display pixel in active electrode matrix 44 of TNLC cell 40. Light source 10 may also include a fluorescent lamp 11 which outputs ultraviolet radiation, chosen for its ability to excite phosphor material to emit visible light, and for its intrinsically high energy conversion efficiency of fluorescent illumination, exceeding 50 lumens per watt.

As radiation reaches the matrix of phosphor elements in phosphor layer 14, the ultraviolet radiation is efficiently converted to colored visible light which is radiated both forwardly, toward TNLC cell 40, and back toward the back of light source 10. A transmissive dichroic filter (not shown in FIG. 1) which reflects visible light may be inserted between fluorescent lamp 11 and phosphor layer 14 to reflect phosphor emissions that travel toward the back of light source 10. Thus, a high percentage of this reflected light is available for illumination of the display.

A backlight source which emits primary colored light in a spatial matrix and which has the same spatial configuration as the matrix of display pixels is described in U.S. Pat. No. 4,799,050 entitled "Full Color Liquid Crystal Display", which is hereby incorporated by reference herein. The light source described therein is suitable for use in the present invention, but must be modified to have only red and green primary color emitters.

For this highly efficient lighting approach to be effective, however, the colored light from each phosphor emitter in phosphor layer 14 must be directly channeled into a respectively aligned liquid crystal display pixel, and substantially all of the channeled light must pass through only one display pixel of TNLC cell 40. If the colored light from one emitter is allowed to spread and pass through an adjacent pixel, the chromatic integrity of the display will be negatively affected.

c. Operation of the light coupling lens array.

Light coupling lens array 30 collects the light rays emitted from each phosphor emitter in phosphor layer 14 and focuses them on the respectively aligned display pixel in the active matrix 44 of TNLC cell 40. The optical characteristics of light coupling lens array 30 are such that substantially all of the collected light rays from each phosphor emitter are focused into a respective, aligned display pixel, as a real, preferably noninverted image, and preferably smaller than the size of the display pixel. Collection of the light from each emitter in this manner will permit the focused light to pass through transparent substrate 42 and the aligned display pixel in active matrix 44 unobscured by the opaque pixel interconnect elements. Similarly, if entrance polarizer 20 is mounted on the rear surface of transparent substrate 42, collection of the light from each emitter in this manner will permit the focused light to pass through entrance polarizer 20 with minimal scattering or divergence. The light coupling lens array thus efficiently provides a high percentage of the light emitted from light source 10 to and through TNLC cell 40.

Several optical elements are suitable for use as light coupling lens array 30, and are discussed in detail below.

d. Creation of the blue image in the second optical path.

Light source 60 provides light energy in the (short) blue wavelength region of the visible spectrum to form the blue component of the full-color image. Light source 60 includes conventional condenser or collimating element 62 for collecting light into telecentric light ray bundles for entry into TNLC cell 70. TNLC cell 70 is constructed in a manner similar to that of TNLC cell 40. Active electrode matrix 76, comprising metalized buses and transparent electrodes, may be fabricated on either transparent substrate 74 or 80, and is shown in FIG. 1 fabricated on the front surface of rear transparent substrate 74. Matrix 76 of display pixels may either be passively addressed via a conventional multiplexing scheme or, preferably, actively addressed with an active matrix of thin film transistors (TFTs) or other conventional "latch-and-hold" circuit elements. Rear transparent substrate 74 encloses a thin film of liquid crystal material 78 between the active matrix 76 and front transparent substrate 80. Front transparent substrate 80 has a transparent conducting coating (not shown), usually indium tin oxide ("ITO"), on the surface facing the liquid crystal material 78 which serves as an electrode for placing a voltage across the liquid crystal material 78 from the voltage source.

The collimated blue light entering TNLC cell 70 is first linearly polarized by polarizer 72. Light passing through liquid crystal material 78 and front transparent substrate 80 then passes through conventional linear polarizer 82, which serves as the analyzer and enables control of the light intensity at each blue display pixel of TNLC cell 70.

e. Combining and displaying the images.

To combine the color image components from the red plus green and blue light paths into a full-color image, the light from the matrix of red and green display pixels passes through yellow-blue dichroic mirror 90, toward optical elements for displaying the image to an observer. Light from the matrix of blue display pixels is reflected from yellow-blue dichroic mirror 90, also toward optical elements for displaying the image to an observer. The two-path, full color liquid crystal color display of the present invention may be viewed on a direct view surface, or it may be projected to a viewing surface.

If a direct view configuration is desired, a light diffuser in the form of an optical screen (not shown) may be used to diffuse the light exiting the display in a manner to meet the requirements of the application so that the full color image formed would be visible to a human observer at substantially all viewing angles, including viewing angles which are perpendicular to the display surface (i.e., "on-axis" viewing angles), and viewing angles which are not perpendicular to the display surface (i.e., "off-axis" viewing angles). Such a screen could be a light scattering device such as ground glass which would isotropically diffuse the image. The screen could also be a lenticular lens which would direct the light in a preferred direction or directions. The use of ground glass or lenticular lenses as screen materials is well known in the art.

If a projection configuration is desired, the full color image may pass through conventional projection lens assembly 100, as shown by example in FIG. 1, which magnifies the full color image and relays the image to an appropriate conventional front or rear viewing surface 102. Examples of suitable image projection methods are known in the art.

It is intended that the present invention as illustrated in FIG. 1 also include other arrangements of the elements of the two optical paths, including different configurations of optical elements for combining the red-plus-green and blue images. The two-path LCLV color display illustrated in FIG. 1 may be particularly suitable in situations requiring a more compact display. In addition, each of the components 10, 30, and 40, of the present invention may be fabricated as discrete elements in order to take advantage of specialized fabrication techniques unique to each component. Each of the components 10, 30, and 40 may be separately mounted, as the application requires. For example, it may be practical to mount the high efficiency light source 10 separately from the remaining components so that it may be easily replaced. Alternatively, each of the components 10, 30, and 40 possibly may be laminated together using conventional techniques.

Advantages of the two path full color liquid crystal display illustrated in FIG. 1 are readily apparent. The two path display makes efficient use of a substantial amount of the light emanating from the high efficiency backlight with its matrix of individual red and green sources, thus eliminating the need for the light absorbing color filter layer used in typical full color liquid crystal displays, and in the two path display disclosed in the copending application by Silverstein et al., without sacrificing the ability to produce a wide gamut of colors and the ability to control color fidelity. Moreover, the primary colored light collected from each emitter and focused through the transparent part of the respectively aligned liquid crystal cell by the light coupling lens array insures the chromatic integrity of the color produced in each individual pixel by substantially eliminating the stray light entering adjacent pixels, avoids shadowing by the opaque portions of the pixel elements, and provides a bright, high contrast, full color image to the observer. In addition, the use of active matrix technology to modulate the light propagating through the display achieves response times suitable for displays having high information content, and suitable for use in conjunction with software which displays animation or uses a pointing device.

2. Embodiment of the two path full color display with color selecting polarizers.

Figure 2:
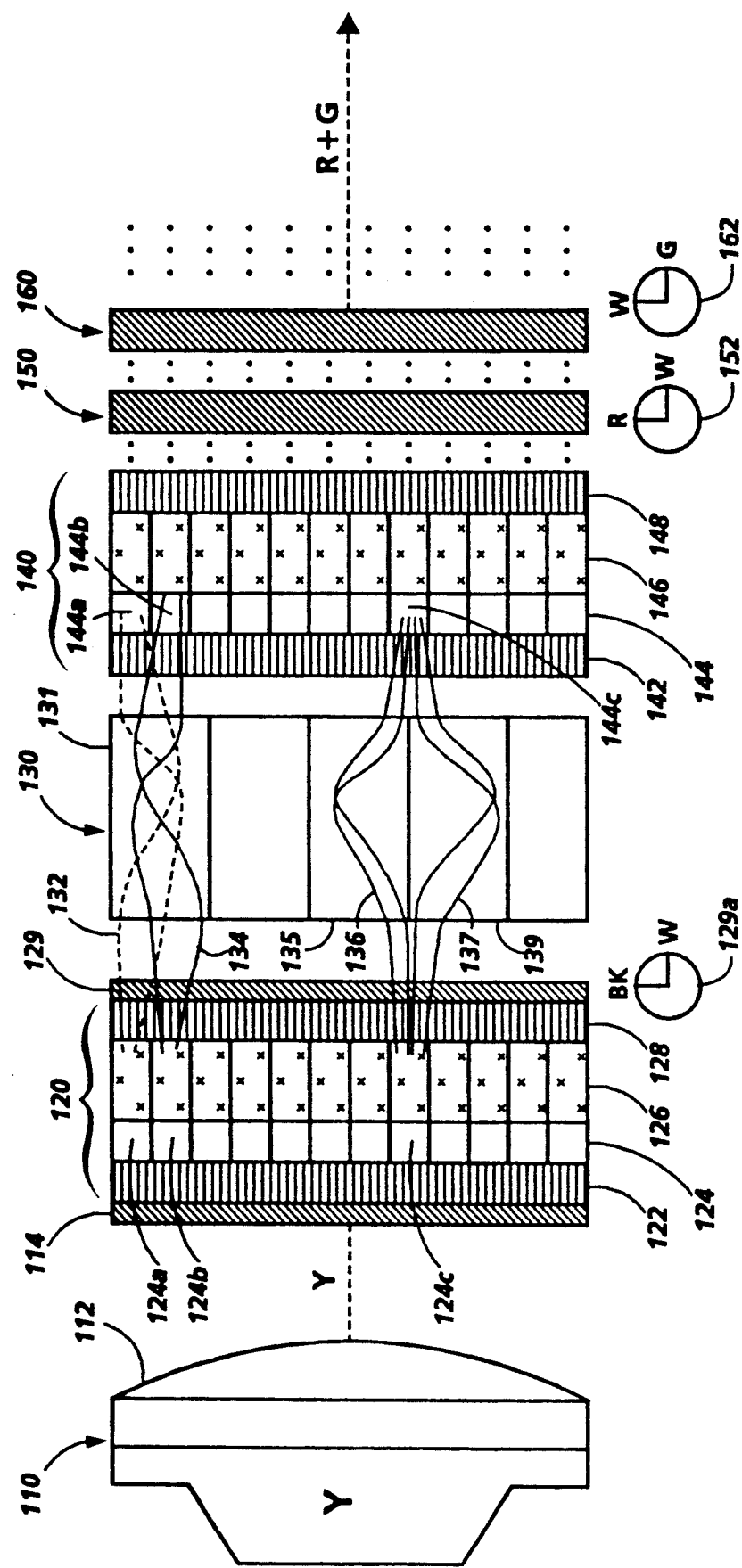
FIG. 2 is an optical schematic view of a second embodiment of the red and green optical path of the color display of the present invention having a light coupling lens array and utilizing color selecting polarizers for forming the red and green image.

Turning now to FIG. 2, there is illustrated a portion of the two path liquid crystal display of the present invention which comprises another embodiment of the red and green optical path of the full color display. The embodiment of FIG. 2 is an improvement over the similar embodiment of the two path full color display disclosed by Silverstein et al. In FIG. 2, the red and green image is formed using a pair of aligned liquid crystal image forming sources 120 and 140 with a pair of color selecting polarizers, 150 and 160. In order to achieve good color fidelity and maintain high overall brightness in the red and green optical path of this embodiment, the yellow light must be carefully channeled to pass through both liquid crystal image forming sources so that substantially all the light that passes through each individual display pixel of first liquid crystal image forming means 120 also passes through the respectively aligned display pixel of second liquid crystal image forming means 140 and through color selecting polarizers 150 and 160 without distortion. Substantially no stray light must pass through adjacent pixels.

In the embodiment illustrated in FIG. 2, yellow light source 110 produces yellow light (that is, combined red and green light) which is initially passed through a conventional condenser or collimating element 112, such as a condensing lens, or collimating lenses, or a conventional spherical or parabolic reflector, which collimates or collects the red and green light components into light ray bundles prior to the yellow light entering the red and green optical path. The collimated yellow light is then linearly polarized by conventional linear polarizer 114 prior to entering first TNLC cell 120.

TNLC cell 120 is constructed in a manner similar to that of TNLC cell 40 in FIG. 1, and modulation of light in TNLC cell 120 is accomplished either passively or actively, in a manner similar to that described for TNLC cell 40. TNLC cell 120 modulates the intensity of the polarized, collimated light propagating through the Y path by rotating the axis of polarization of the incoming polarized light through an angle between 0° and 90°, depending on the voltage applied to the cell, to correspond with the desired intensity level of the light. TNLC cell 120 is used in combination with linear polarizer 129, which acts as a polarization state analyzer, for intensity, or gray scale, control of the red and green display pixels. By way of example, symbol 129a illustrates that polarizer 129 transmits the full spectrum of light polarized in a horizontal orientation, and absorbs light polarized in the orthogonal orientation. In the remainder of the description of the embodiment illustrated in FIG. 2 which follows, the light emerging from linear polarizer 129 in a horizontal orientation will be considered as being in a first polarization orientation as it enters the remaining optical elements. It will be understood by those skilled in the art that references in the following description to polarization orientations of "vertical" and "horizontal" are for illustrative purposes only, and that other pairs of orthogonal polarization orientations are encompassed by the embodiment of the present invention illustrated in FIG. 2.

The intensity controlled and collimated polarized light emanating from linear polarizer 129 passes through a second TNLC cell 140 with a matrix of addressable display pixels. TNLC cell 140 is positioned with respect to TNLC cell 120 such that the matrix of addressable display pixels of TNLC cell 140 is substantially aligned with the matrix of addressable display pixels of TNLC cell 120.

Light passing from an individual display pixel in TNLC cell 120 is optically aligned with and coupled to a respectively aligned display pixel in second TNLC cell 140 by means of light coupling lens array 130, disposed between TNLC cells 120 and 140. Light coupling lens array 130 collects the polarized, intensity controlled yellow light rays passing through each individual display pixel in TNLC cell 120 and focuses them on the aligned display pixel in the active matrix 144 of TNLC cell 140. The optical characteristics of light coupling lens array 130 are such that substantially all of the collected light rays from each display pixel in TNLC 120 are focused into the respective display pixel of TNLC cell 140 as a real, preferably noninverted image, and preferably smaller than the size of the display pixel. Collection of the light from each display pixel in this manner will permit substantially all of the focused light from display pixels in TNLC cell 120 to pass through transparent substrate 142 and aligned display pixels in active matrix 144 unobscured by the opaque pixel interconnect elements.

TNLC cell 140 controls the selection of color along the red-green colorimetric axis by rotating the axis of polarization of the incoming polarized light through an angle between 0° and 90°, depending on the voltage applied to the cell. Selection of colors along the colorimetric axis from red through green is accomplished with two orthogonally oriented color polarizers 150 and 160 which are thin sheet materials with dyes which function as color-specific light analyzers of the polarized light passing through them. By way of example, symbol 152 shows that first color polarizer 150 absorbs light with a vertical orientation except for red light, so that white (or yellow) light polarized in a vertical orientation (i.e., orthogonal to the first polarization orientation) is transmitted as red light. Light polarized in a horizontal orientation (i.e., in the first polarization orientation) is not absorbed, so both red and green light polarized in the horizontal orientation is transmitted. Symbol 162 illustrates by way of example that second color polarizer 160 transmits both red and green light with a vertical orientation and transmits only green light polarized in the horizontal orientation. Intensity controlled and collimated polarized light oriented between the two orthogonal states results in a combination of both red and green light passing through color polarizers 150 and 160, thereby permitting the selection of a range of colors along the red and green colorimetric axis.

Figure 3A:
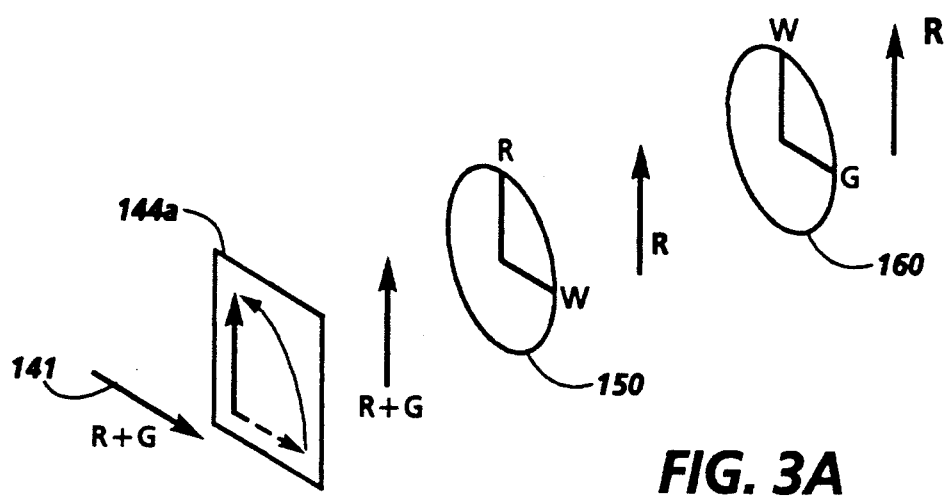
FIGS. 3A, 3B, and 3C are views illustrating the operation of the liquid crystal color selection means of the embodiment illustrated in FIG. 2.
Figure 3B:
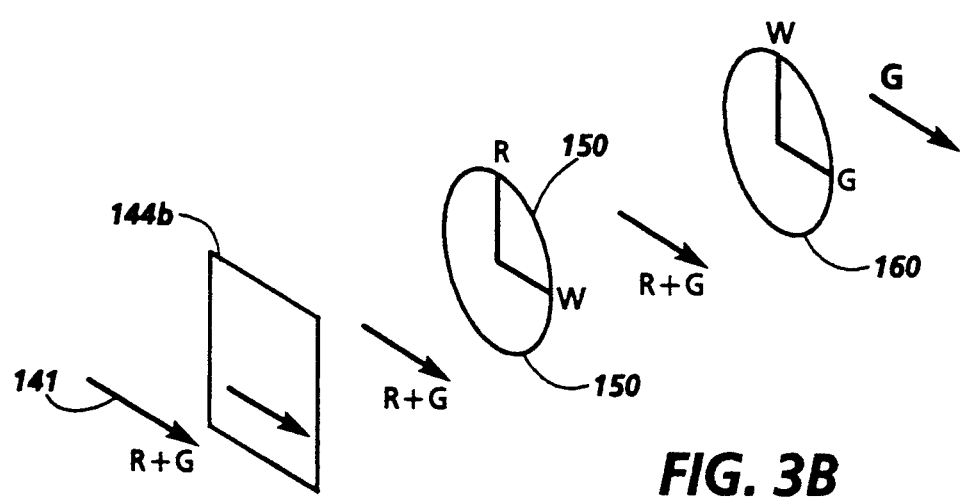
Figure 3C:
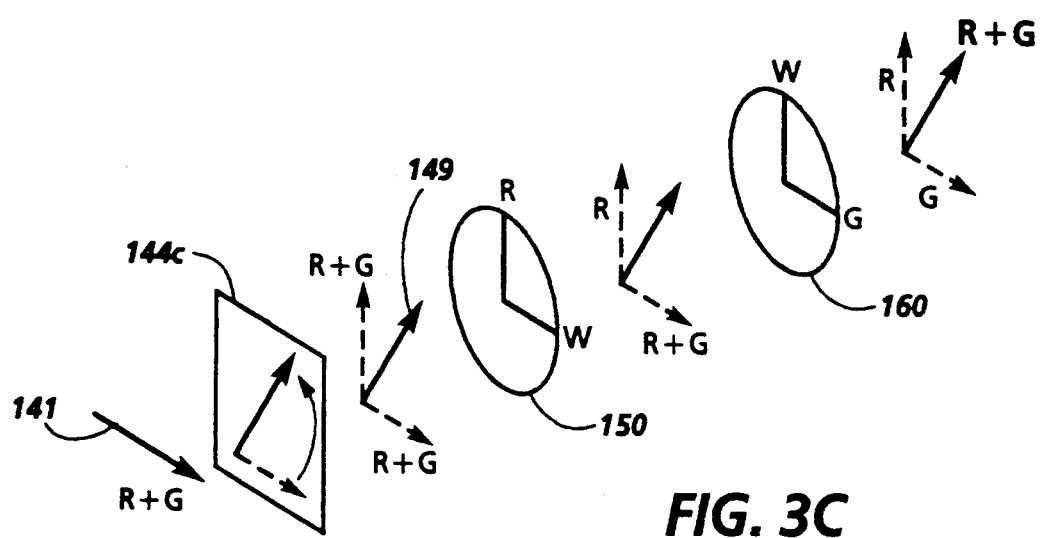

FIGS. 3A, 3B, and 3C illustrate the operation of color selection polarizers 150 and 160 in more detail. With reference first to FIG. 3A, red and green light, polarized in a horizontal (first polarization) orientation by linear polarizer 114 (FIG. 2) and channeled into TNLC cell 140 by light coupling lens array 130, is represented by arrow 141. The polarized light enters individual display pixel 144a in the display pixel matrix 144 of TNLC cell 140. Through conventional addressing techniques, the individual display pixel is addressed and energized to rotate the axis (plane) of polarization of the incoming light in a range from a first angle, for example, zero degrees (0°) when the display pixel should produce a pure green hue, to a second angle, for example, ninety degrees (90°), when the display pixel should produce a pure red hue, depending on the voltage applied to the cell. In FIG. 3A, display pixel 144a represents a red hue pixel in the final red plus green image. The polarized red and green light represented by arrow 141 is rotated to the second angle, 90° (ninety degrees) in the example, from its horizontal orientation to represent the color red. Light exiting display pixel 144a then enters first color polarizer 150 which transmits red light polarized in the vertical orientation (i.e., orthogonal to the first, or horizontal, orientation), blocks green light polarized in the vertical polarization orientation, and transmits broadband (white) light polarized in the horizontal orientation. The vertically polarized red light emanating from display pixel 144a will pass through color polarizer 150, and vertically polarized green light will not be transmitted. The transmitted red light from color polarizer 150 then enters second color polarizer 160 which transmits green light polarized in the horizontal orientation, transmits broadband (white) light polarized in the vertical orientation, and blocks red light polarized in the horizontal orientation. The red light emanating from color polarizer 150, which is in the vertical orientation, will be transmitted through color polarizer 160.

Similarly, FIG. 3B illustrates the propagation of light through TNLC cell 144 and color polarizers 150 and 160 when display pixel 144b represents a green hue display pixel in the final red plus green image. Again, arrow 141 represents the red and green light, polarized in a horizontal (first) orientation by linear polarizer 114 (FIG. 2) and channeled into TNLC cell 140 by light coupling lens array 130, entering display pixel 144b. The light will not be rotated from its first angle, that is, the light will be rotated 0° (zero degrees) from its horizontal orientation, to represent a green color. Light emanating from display pixel 144b thus remains polarized in the first (or horizontal) orientation. Color polarizer 150 will transmit both red and green light in a horizontal orientation, so the red and green light emanating from display pixel 144b is transmitted by color polarizer 150. Color polarizer 160 transmits only green light polarized in a horizontal orientation, and so the red light polarized in the horizontal orientation is blocked, and only green light is transmitted by color polarizer 160.

Finally, FIG. 3C illustrates the propagation of light through TNLC cell 140 and color polarizers 150 and 160 when display pixel 144c represents a color between the red and green colors, such as a yellow hue image pixel, in the final red plus green image which exits the Y path. The light represented by arrow 141 enters display pixel 144c and is rotated from a first angle representing its horizontal orientation to a second angle, shown as 45° (forty-five degrees), to represent the desired yellow hue. The polarized red plus green light emerging from display pixel 144c, shown by arrow 149, is actually composed of vertically polarized red and green light components and horizontally polarized red and green light components, as shown by the dotted line vectors labeled "R+G". The polarized red plus green light then enters color polarizer 150. Color polarizer 150 transmits the red light components polarized in a vertical orientation, transmits both red and green light components polarized in a horizontal orientation, and blocks the green light components polarized in the vertical orientation. Color polarizer 160 transmits the green light components polarized in the horizontal orientation, blocks the red light components polarized in the horizontal orientation, and transmits the red light components polarized in the vertical orientation. In this manner, polarization vectors oriented between the two orthogonal states result in a combination of quantities of both red and green light components passing through color polarizers 150 and 160, thereby permitting the selection of a range of colors along the red and green colorimetric axis.

Finally, in the second embodiment, blue light along the B path and the final combination of the red plus green and blue images, although not shown in FIG. 2, are treated in the same manner as described above in conjunction with the embodiment illustrated in FIG. 1.

Figure 4:
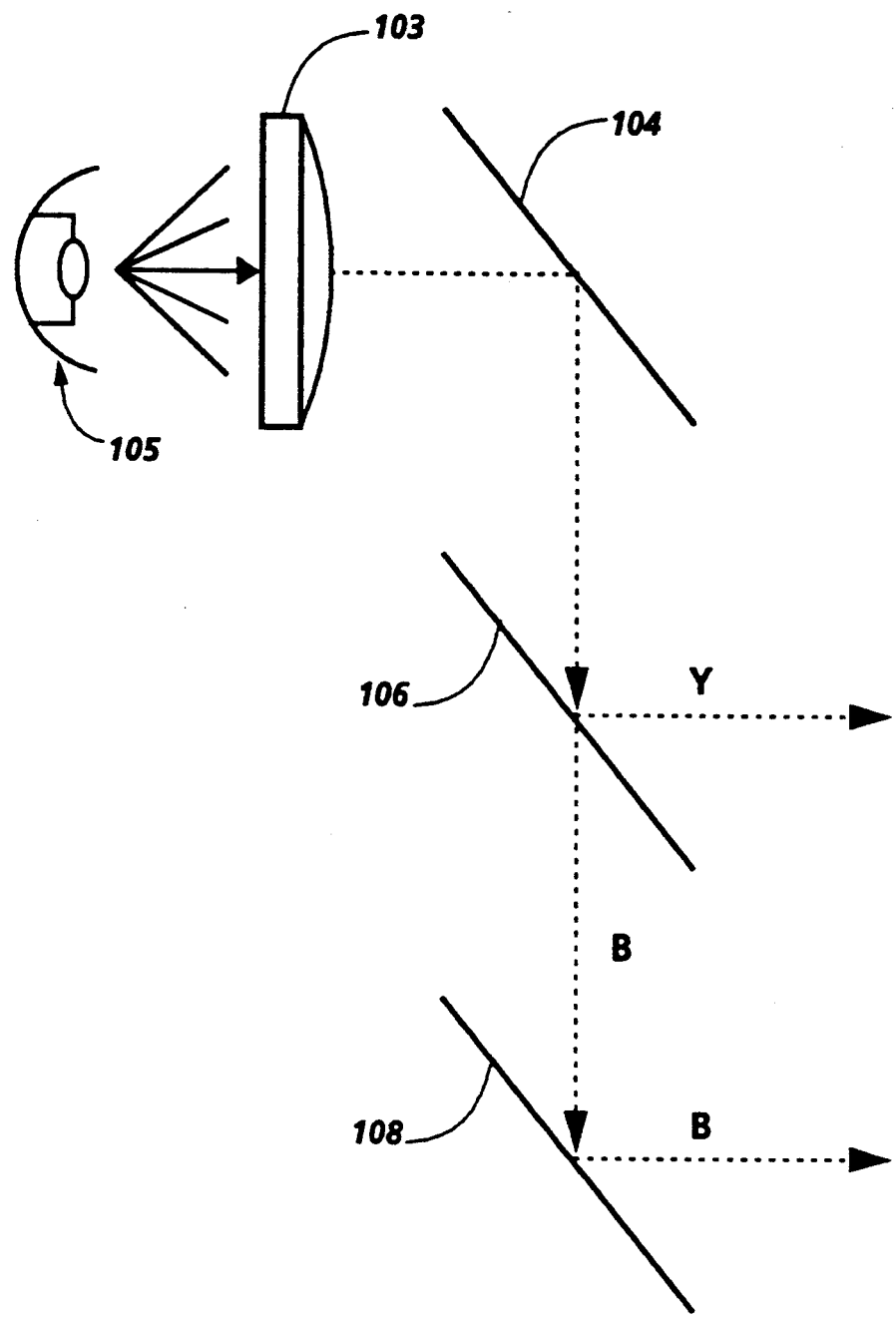
FIG. 4 is an optical schematic view of a portion of the color display of the present invention illustrating one optical configuration for the light paths for the embodiment illustrated in FIG. 2.

FIG. 4 illustrates an alternative configuration for the light source 110 (FIG. 2) and light source 60 (FIG. 1) in the second embodiment. In this alternative configuration, a single light source 105 is used to provide illumination for the display. Light source 105 may provide a continuous, broadband spectral power distribution or may be constructed so as to produce spectral peaks in the red, green, and blue portions of the visible spectrum. The light emanating from light source 105 is initially passed through one or more optical elements collectively labeled as 103 on FIG. 4. Optical elements 103 may comprise any conventional light collecting, bundling, or collimating elements, such as a conventional spherical or parabolic reflector, condensing lens, or collimating lenses, according to the light requirements of the optical components of the specific implementation of the two path color display. Essentially, optical elements 103 serve to collect and bundle the light rays from light source 105 into a telecentric light ray bundle, as for example, via a condensing lens, or into parallel collimated light rays, as for example via one or more collimating lenses.

The collimated light emerging from optical elements 103 is then passed to a heat removing optical element 104 for removing nonvisible infrared radiation from the broadband light emanating from light source 105. The nonvisible infrared radiation transmitted by optical element 104 is manifest as heat and may be dissipated by a convection heat sink or forced air cooling (not shown). Methods for handling heat generated by light source 105 are generally known in the art.

The collimated light reflected by optical element 104 is passed to a yellow-blue dichroic mirror 106 which reflects middle (green) and long (red) wavelengths. Together, the red and green portions of the spectrum produce what is visually perceived as yellow light, and the reflected light path from dichroic mirror 106 is labeled as the Y path in FIG. 4. Dichroic mirror 106 transmits the short wavelength or blue portion of the visible spectrum. The blue light is subsequently reflected through a 90° angle by a front surface mirror 108 to enter the blue light path, labeled the B path in FIG. 4.

It will be understood by those skilled in the art that optical elements 103 may be positioned at other points in the red-plus-green and blue optical paths. For example, the broadband light emanating from light source 105 may be collimated after separation and reflection by mirrors 104, 106, and 108, with optical element 103 being placed at the entry to each of the optical paths.

The collimated red and green light components and the collimated blue light component then continue in the first and second optical paths, respectively, as previously described above in conjunction with the discussion accompanying FIG. 2.

It can be appreciated from the description of this embodiment of the two path color display of the present invention that several advantages result from the configuration of the display which uses polarizers for color selection. In particular, the embodiment illustrated in FIG. 2 maintains full color control along the red to green colorimetric axis at each addressable display pixel, rather than from combining separate red and green display pixels in one TNLC cell. Thus, each addressable red-to-green display pixel is the equivalent of an image pixel in the displayed image, providing flexibility in display design to meet a variety of design goals. For example, image resolution and quality can be improved, without sacrificing color control, over a similarly sized LCLV using additive spatial juxtaposition of display pixels to create a mixture color, such as illustrated in the first embodiment in FIG. 1, since twice as many display pixels may be used to create an image that is the same size as the image created by the LCLV in FIG. 1. Similarly, a full color display having greater overall perceived brightness than, but the same effective resolution as, the display shown in FIG. 1 is achievable by simply using larger display pixels having a larger transparent portion in each pixel. Alternatively, the display itself could be fabricated with a smaller TNLC cell with no loss of image resolution or brightness but at a lower cost, resulting from decreased fabrication costs and from the use of smaller optical elements.

Also, while this embodiment uses two TNLC cells in one of the optical paths which must maintain careful display pixel alignment, this alignment is relatively easy to achieve and maintain using conventional techniques, since the cells are positioned very close together in the yellow optical path. This alignment is more easily achieved than the alignment of the red and green images required in a display system having three optical paths.

More importantly, however, is the fact that the luminous efficiency and overall perceived brightness of the final full color image will be improved over the analogous embodiment disclosed by Silverstein et al. in the copending application cited earlier. Overall luminous efficiency in the analogous embodiment of the earlier cited application was largely determined by the degree of light collimation required, which was acknowledged as substantial when a red and green image of high image resolution was required for the display application. The embodiment of the present invention illustrated in FIG. 2 optically couples and focuses the light from each of the display pixels in the first TNLC cell to a respectively aligned display pixel in the second TNLC cell, thereby increasing the light propagating through the display.

3. Light coupling lens array embodiments.

a. Rod Lens Array with Graded Index of Refraction.

In FIGS. 1 and 2, light coupling lens arrays 30 and 130, respectively, are each illustrated as an array of gradient index rod lenses, hereafter referenced by the trade name of a "SELFOC®" lens array. SELFOC is a trademark owned by Nippon Sheet Glass Co. Other configurations of optical elements are also suitable for use as a light coupling lens array in the present invention, and these other embodiments will be described below.

With reference now to FIG. 1, SELFOC lens array 30 is built from an array of individual optical fibers 31 and 33 each of which has a graded index of refraction which is larger in the middle than on the edge, each fiber having cylindrical symmetry about the fiber axis, and, in general, flat, planar entrance and exit faces. The graded index of refraction has the effect of refracting light in a way similar to a convex lens. The SELFOC lens array of the present invention may be constructed according to known conventional fabrication techniques.

SELFOC array 30 is two dimensional, and may be arranged in an offset structure. Interstitial area between individual SELFOC lenses must be filled with a light absorbing mask or shield (not shown) in order to prevent light from passing between the individual SELFOC lenses, since such light would not be properly collected and focused and would potentially stray into adjacent display pixels. Those skilled in the art will recognize that the two-dimensional array of SELFOC lenses utilized in the two path liquid crystal full color display of the present invention functions analogously to the linear SELFOC lens array known in the art for use in electrophotographic copying devices.

As illustrated in FIG. 1, SELFOC lens array 30 is positioned between phosphor emitter layer 14 (which is fabricated on the rear surface of reflecting dichroic layer 12) and active matrix layer 44 mounted on transparent substrate 42. As noted above, thin film entrance polarizer 20 may be positioned anywhere between phosphor emitter layer 14 and TNLC cell 40. FIG. 1 illustrates thin film entrance polarizer 20 mounted on the rear surface of SELFOC lens array 30; alternatively, thin film entrance polarizer 20 may be mounted on the front surface of SELFOC lens array 30 or on the rear surface of transparent substrate 42. An individual lens 31 of SELFOC lens array 30 is larger than and images more than one phosphor light emitter. In addition, substantially all of the light leaving any single emitter point may be collected by more than one individual SELFOC lens into the same image point in a respectively aligned display pixel. For example, as shown in FIG. 1, light leaving green emitter 16 passes through both individual lenses 31 and 33 (via ray traces 32 and 34) and is imaged on aligned display pixel 44b.

In the embodiment of the present invention illustrated in FIG. 2, SELFOC lens array 130 is positioned between TNLC cell 120 and TNLC cell 140. An individual lens 131 of SELFOC lens array 130 is larger than and images more than the light emanating from one display pixel of the active matrix 124 of TNLC cell 120. For example, light leaving both display pixels 124a and 124b is collected in individual SELFOC lens 131 and imaged (via ray traces 132 and 134) in aligned pixels 144a and 144b, respectively. In addition, substantially all of the light leaving any single display pixel in TNLC cell 120 may be collected by more than one individual SELFOC lens into the same image point in the respectively aligned display pixel in TNLC cell 140. For example, light leaving display pixel 124c in active matrix 124 of TNLC cell 120 passes through both individual lenses 135 and 139 and is imaged in aligned display pixel 144c (via ray traces 136 and 137).

To prevent the light from being inverted by the SELFOC lens array when it is imaged on the respectively aligned display pixel, lens arrays 30 and 130 are shown in FIGS. 1 and 2, respectively, in their preferred configuration of individual two phase SELFOC lenses, each of which collects the light from a point and causes it to be refocused twice so that the image on the second focal plane where it is imaged on the liquid crystal light valve is not inverted. Those skilled in the art will recognize that maintaining a noninverted image more easily preserves the light coupling correspondence. A single phase SELFOC lens array may also be used in the implementation of the present invention, with appropriate adjustments being made as necessary for controlling light modulation and image formation in the light valve.

b. Plural Strip Lens Arrays.

Figure 5A:
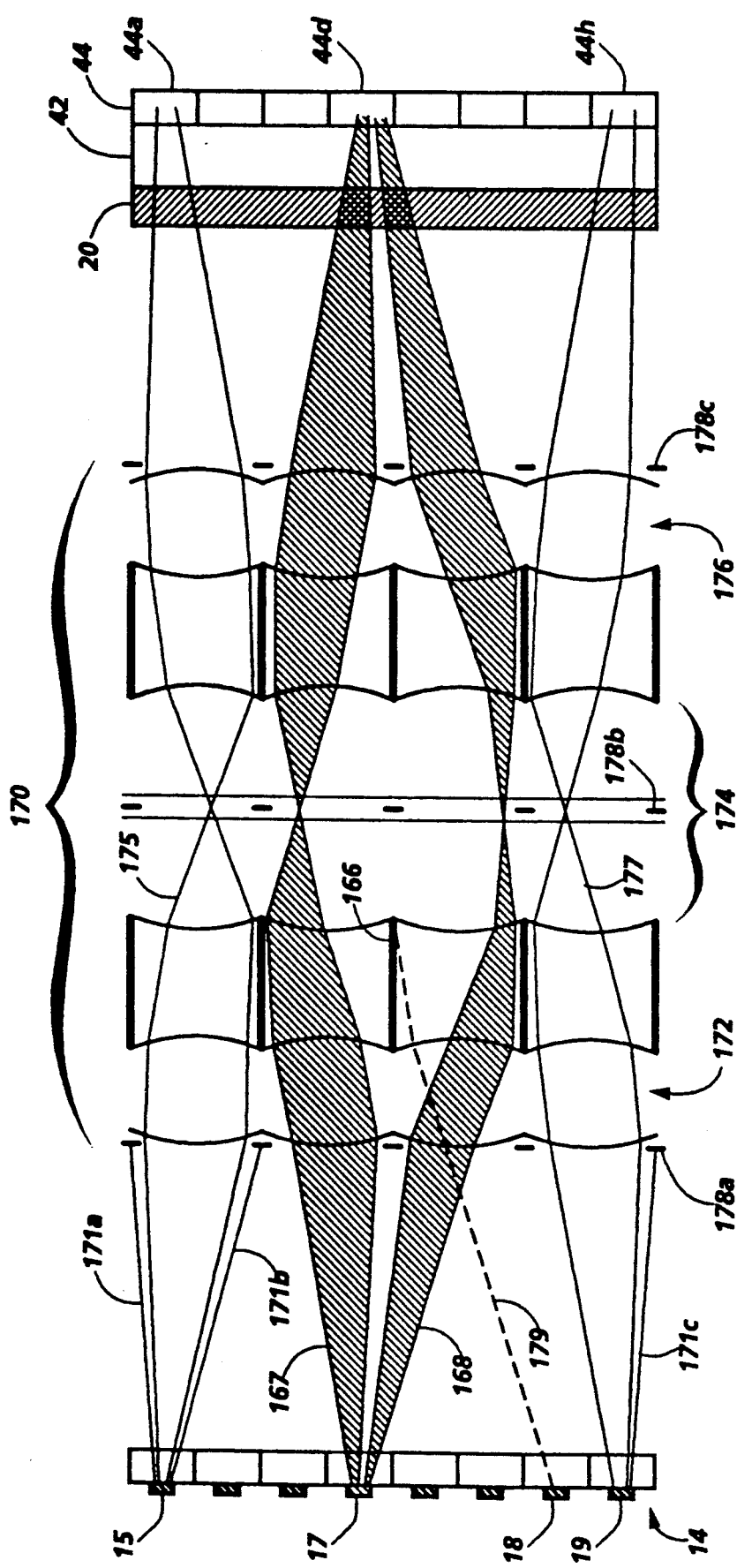
FIG. 5A is a schematic side view of a portion of the two path, full color display of FIG. 1 which illustrates a multiple layer, two dimensional strip lens array as the light coupling lens array of the invention and which serves to illustrate light propagation through the optical elements in the red and green optical path.
Figure 5B:
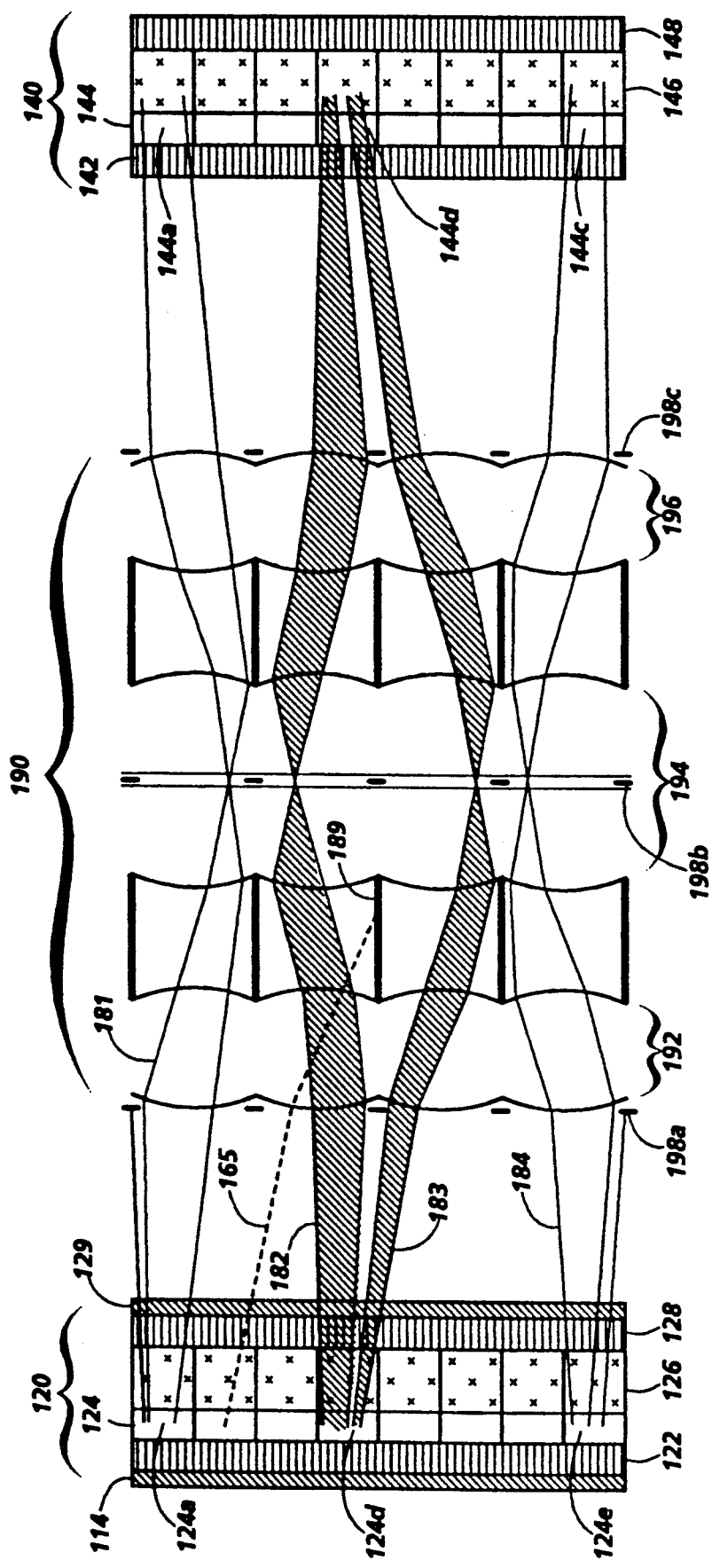
FIG. 5B is a schematic side view of a portion of the two path, full color display of FIG. 2 which illustrates a multiple layer, two dimensional strip lens array as the light coupling lens array of the invention and which serves to illustrate light propagation through the optical elements in the red and green optical path.

FIGS. 5A and 5B illustrate a multiple layer, two-dimensional planar array of lenslets, or microlenses, generally designated by the reference numerals 170 and 190, respectively. Arrays 170 and 190 are, in essence, the two dimensional analog of what is known in the art as a "strip lens", and each will hereafter be referred to as a "strip lens array". Strip lens array 170 is suitable for use in the present invention as a light coupling lens array in place of SELFOC lens array 30 of FIG. 1, and strip lens array 190 is suitable for use as a light coupling lens array in place of SELFOC lens array 130 of FIG. 2. The multiple layer, planar array of lens elements may be made of any substance suitable for the purpose of the display, including molded plastic, glass, or quartz. Manufacture of such a lens array is known in the art (see for example, art related to the use of strip lens arrays in electrophotographic copying devices), and may include, but is not limited to, the utilization of a plastic molding polymerization method, or an ion exchange diffusion method.

Each of the plural layers of lens arrays 170 and 190 is in substantial alignment with an adjacent layer. Light absorbing shields, or aperture plates, 178a, 178b, and 178c (FIG. 5A) and 198a, 198b, and 198c (FIG. 5B), fabricated of suitable light absorbing material, are placed at the juncture of the individual strip lenses in each layer of lens arrays 170 and 190, as shown in FIGS. 5A and 5B. Aperture plate 178a, of FIG. 5A, for example, absorbs stray light from the phosphor emitters of phosphor layer 14, such as rays 171a and 171b from phosphor emitter 15, and ray 171c from phosphor emitter 19. Similarly, horizontally positioned baffles, as illustrated by baffle 166 in FIG. 5A and baffle 189 in FIG. 5B, also fabricated of suitable light absorbing material, are located at lens junctures between the adjacent layers of the strip lens array to absorb light that would not be imaged correctly into the appropriate pixel. For example, light ray 179 from phosphor emitter 18 in FIG. 5A is absorbed by baffle 166.

With reference to FIG. 5A, each of the plural layers of lens array 170 will be referred to hereafter as first imaging element 172, field imaging element 174, and second imaging element 176. The combination of first imaging element 172 and second imaging element 176 produces a real, noninverted image of the phosphor in the respective display pixel. The effective distance between phosphor matrix 14 and first imaging element 172 is preferably greater than the distance between first imaging element 172 and field imaging element 174. Thus, the image of the light emitted from a phosphor emitter is demagnified in the plane of field imaging element 174. Similarly, the effective distance between second imaging element 176 and display pixel matrix 44 is preferably greater than the distance between field imaging element 174 and second imaging element 176. Thus, the demagnified image in the plane of field imaging element 174 is reimaged and magnified in the respective display pixel in matrix 44 by second imaging element 176. The demagnification and subsequent magnification of the imaged light substantially eliminates uneven imaging of the light from the phosphor emitters in the respective display pixels of active matrix 44. Some of the light from certain emitters may strike microlens array 170 at a juncture of individual lenses; this light is absorbed by aperture plate 178a and is not imaged in the respective display pixel. With placement of the imaging elements so as to provide for demagnification of the inverted image, and subsequent magnification of the noninverted image, substantially all light that is collected from each emitter is uniformly imaged in the respective display pixel of active matrix 44. In addition, field imaging element 174 also prevents vignetting. That is, the light rays forming the image points near the edge of a lenslet would miss the second imaging element 176, causing poor illumination for these points near the edge of each lenslet. Field imaging element 174 redirects these rays back into the lenslets in second imaging element 176, thus achieving uniform illumination on active matrix 44. The preferred combination and placement of these three imaging elements of microlens array 170 thus provides relatively uniform imaging of the entire plane of the light emitting phosphor layer 14 and, consequently, relatively uniform illumination on the display pixels of active matrix 44.

As shown by the trace 175 of light rays leaving phosphor emitter 15, a microlens of first imaging element 172 creates a real, inverted and preferably demagnified image of the visible primary color light rays emitted from phosphor element 15 in the plane of field imaging element 174. A microlens of second imaging element 176 reimages and preferably magnifies this real image into the respective pixel element 44a of active matrix 44. Similarly, as shown by the trace 177, light rays leaving phosphor emitter 19 are directed into respective display pixel 44h of active matrix 44. Traces 167 and 168 of light rays leaving phosphor emitter 17 illustrate that two strip lenses may image light from the same phosphor emitter and direct it into respective display pixel 44d. Note that in FIG. 5A, entrance polarizer 20 is shown fabricated on the rear surface of transparent substrate 42. Strip lens array 170 is capable of focusing light through polarizer 20 without image distortion into the display pixels of active matrix 44.

Turning now to FIG. 5B, each of the plural layers of lens array 190 will be referred to hereafter as first imaging element 192, field imaging element 194, and second imaging element 196. The positioning of these imaging elements in lens array 190 is analogous to the positioning of the imaging elements in lens array 170 of FIG. 5A. That is, the combination of first imaging element 192 and second imaging element 196 produces a real, noninverted image of light emanating from display pixels in TNLC cell 120 in the respective display pixels of TNLC cell 140. The effective distance between the active matrix 124 of TNLC cell 120 and first imaging element 192 is preferably greater than the distance between first imaging element 192 and field imaging element 194. Similarly, the effective distance between second imaging element 196 and display pixel matrix 144 is preferably greater than the distance between field imaging element 194 and second imaging element 196. The demagnified image in the plane of field imaging element 194 is reimaged and magnified in the respective display pixel in matrix 144 by second imaging element 196.

The operation of first imaging element 192, second imaging element 196, and field imaging element 194 is identical to that of strip lens array 170 described above. Ray traces 181, 182, 183, and 184 shown in FIG. 5B illustrate the imaging of the light from the display pixels of TNLC cell 120 into the display pixels of TNLC cell 140. Polarized, intensity-controlled light emanating from display pixel 124a is collected and imaged by strip lens array 190 into display pixel 144a (via ray trace 181), while polarized, intensity-controlled light from display pixel 124e is collected and imaged by strip lens array 190 into aligned display pixel 144c (via ray trace 184). In the case of light emanating from display pixel 124d, ray traces 182 and 183 illustrate that light from any one display pixel may be imaged by more than one lenslet. It can thus be seen that strip lens array 190 provides relatively uniform imaging of substantially all of the light from the display pixels of TNLC cell 120 onto corresponding display pixels in TNLC cell 140.

c. Microlens Array.

Figure 6A:
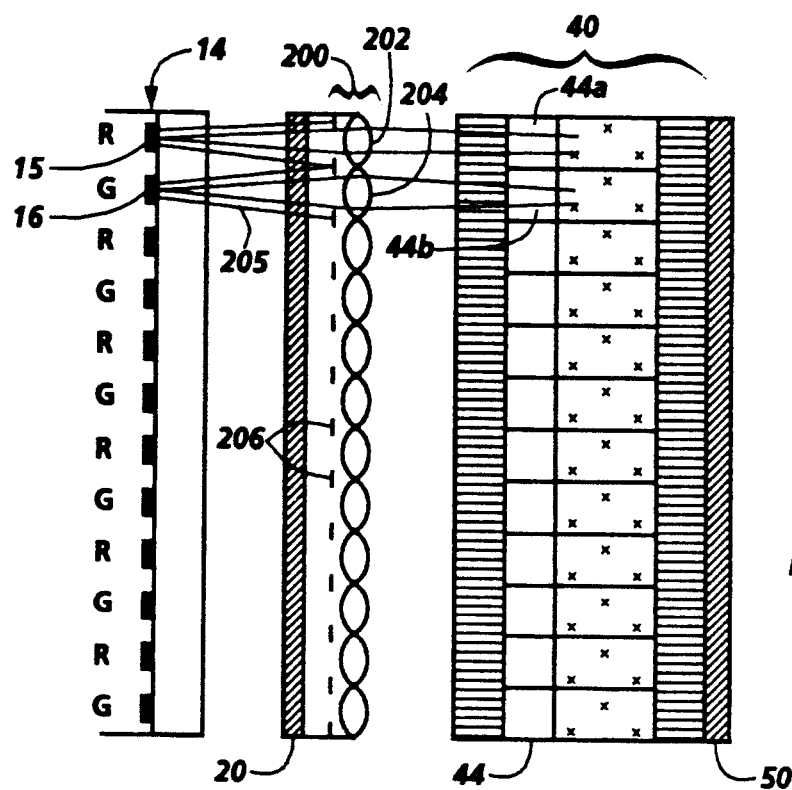
FIG. 6A is a schematic side view of a portion of the full color display of FIG. 1 which illustrates a two dimensional planar array of microlenses as the light coupling lens array according to the invention and which serves to illustrate light propagation through the optical elements in the red and green optical path.
Figure 6B:
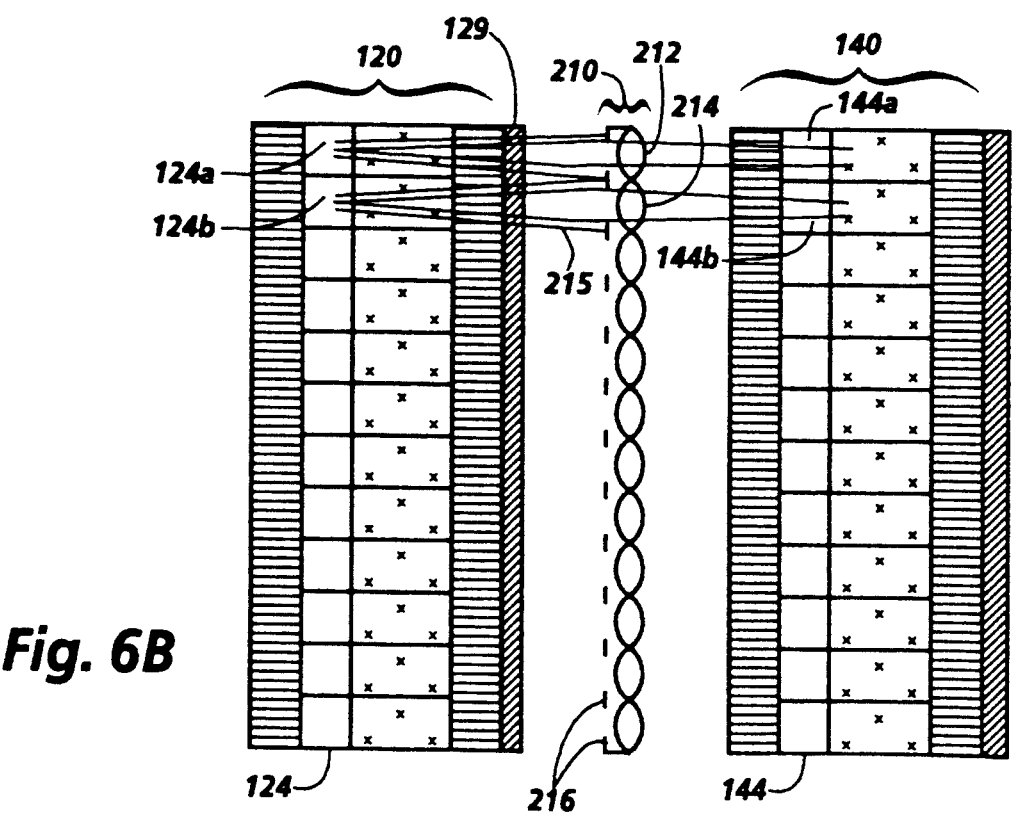
FIG. 6B is a schematic side view of a portion of the full color display of FIG. 2 which illustrates a two dimensional planar array of microlenses as the light coupling lens array according to the invention and which serves to illustrate light propagation through the optical elements in the red and green optical path.

FIGS. 6A and 6B illustrate microlens arrays 200 and 210, each of which is suitable for use as a light coupling lens array in the present invention. With reference first to FIG. 6A, microlens array 200 is suitable for use as a light coupling lens array in place of SELFOC lens array 30 of FIG. 1. Each individual lenslet 202 and 204 of microlens array 200 is approximately the same size as a display pixel in active matrix 44 of TNLC cell 40, so that one microlens 202 images only the light from one phosphor emitter 15 and focuses it into the corresponding display pixel 44a of active matrix 44. Light from an individual light emitter which might otherwise enter an adjacent lenslet, for example light ray 205 emanating from phosphor emitter 16, is optically masked by an opaque, light absorbing shield 206 from reaching a display pixel of active matrix 44 other than the aligned display pixel 44b. Microlens array 200 may be fabricated according to known techniques. The focusing power of each lenslet in microlens array 200 is chosen to form a real inverted image which is smaller than the size of a display pixel in active matrix 44. Those skilled in the art will recognize that, because microlens array 200 is located in close proximity to phosphor layer 14, the individual microlenses of microlens array 200 require a steep cone angle, and thus a relatively short focal length, a requirement which will affect the choice and thickness of the substrate upon which the microlenses are fabricated.

With reference now to FIG. 6B, microlens array 210 is suitable for use as a light coupling lens array in place of SELFOC lens array 130 of FIG. 2. Microlens array 210 is constructed and operates in a manner similar to microlens array 200. Each individual lenslet 212 and 214 is approximately the same size as a display pixel in active matrix 144 of TNLC cell 140, so that one microlens 212 images only the light from one display pixel 124a in active matrix 124 of TNLC cell 120 and focuses the imaged light into the aligned display pixel 144a of active matrix 144. Light from an individual display pixel which might otherwise enter an adjacent lenslet, for example light ray 215 emanating from display pixel 124b, is optically masked by an opaque, light absorbing shield 216 from reaching a display pixel of active matrix 144 other than aligned display pixel 144b. The focusing power of each lenslet in microlens array 210 is chosen to form a real inverted image which is smaller than the size of a display pixel in active matrix 144. Individual microlenses of microlens array 210 also require a steep cone angle, and thus a relatively short focal length, a requirement which will affect the choice and thickness of the substrate upon which the microlens array is fabricated.

4. Display Resolution.

The liquid crystal color display with light coupling lens array of the present invention may be constructed so that the two images produced by the two optical paths of the display have the same image resolution. However, the display may also be constructed to produce the blue light image with an image resolution lower than of the red and green image. A blue image with a lower resolution than the resolution of the red and green image, within the limits discussed below, increases the overall space-average intensity of the short wavelength light contribution to the final full color image, without increasing the intensity of the light source, and without reducing the effective resolution of the full color image, since the full color image has the same effective resolution as that of the red and green image. The separate optical path for short (blue) wavelength light, and the formation of the blue image with a lower sampling density, or resolution, increases the overall perceived image and display brightness, provides a brighter display white point, and provides brighter color rendition for colors having a blue component.

Figures 7A, 7B, 7C:
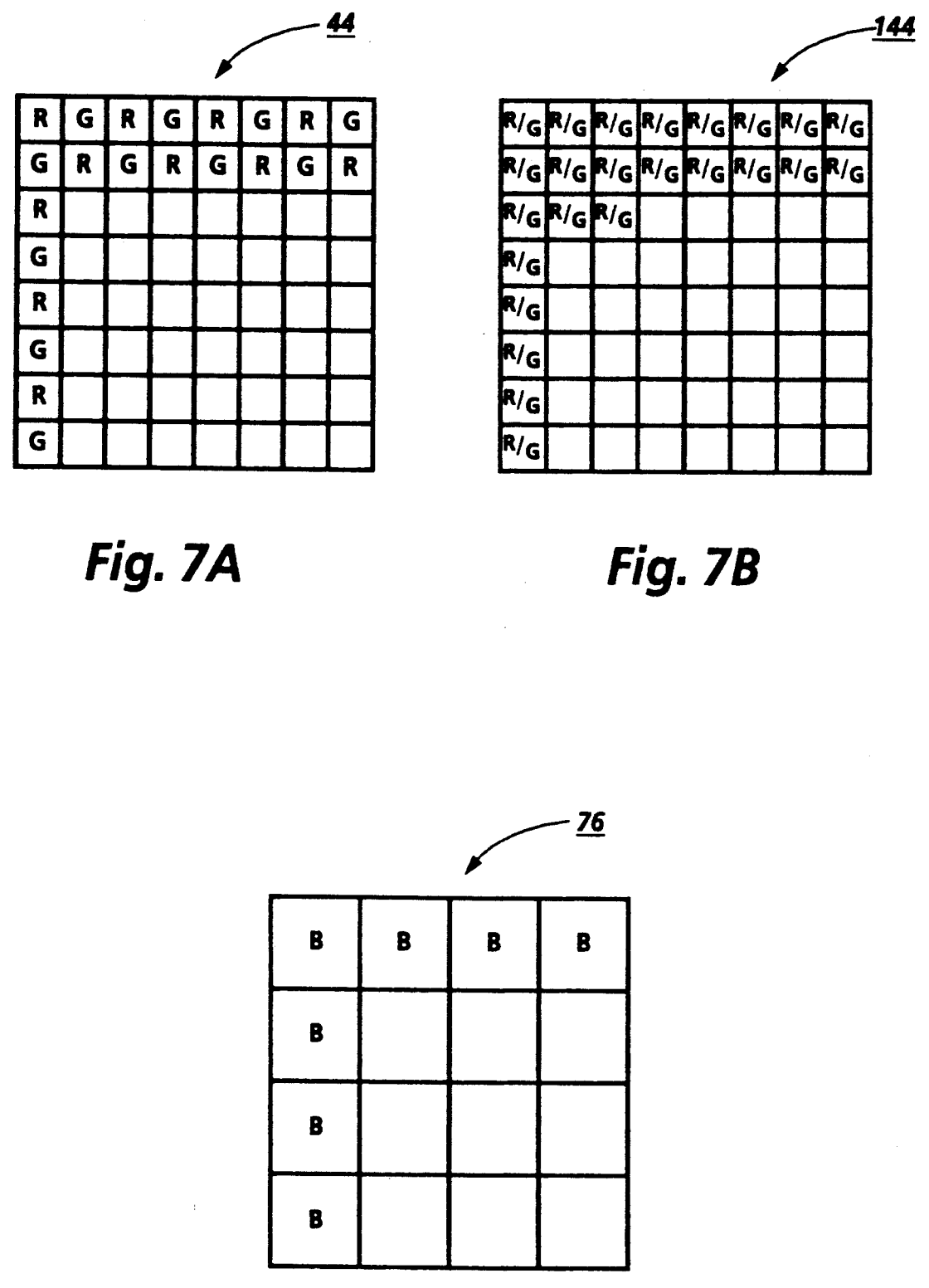

FIGS. 7A, 7B and 7C illustrate this concept of a lower image resolution for the blue image formed in the second optical path. FIG. 7A is a simplified, front view diagram of active matrix layer 44 for red and green image forming TNLC cell 40 of FIG. 1, illustrating a display pixel resolution of 8 by 8 display pixels, which in turn represents a red and green image resolution of 4 by 8 (or 8 by 4) image pixels, when the red and green display pixels are used to form a mixture color along the red to green colorimetric axis by the additive spatial proximity technique discussed earlier. Similarly, FIG. 7B illustrates active matrix layer 144 of red and green image forming TNLC cell 140 of FIG. 2. Each display pixel in active matrix 144 is capable of producing a color along the red to green colorimetric axis. Thus, active matrix 144 illustrates a red plus green image resolution of 8 by 8 image pixels, since each display pixel in the red and green image produced by TNLC cell 140 is the equivalent of an image pixel in the final, full color image.

FIG. 7C, a simplified, front view diagram of active matrix layer 76 for blue image forming TNLC cell 70 of FIG. 1, illustrates a display pixel resolution of 4 by 4 display pixels, which in turn represents a blue image resolution of 4 by 4 image pixels, since each display pixel is the equivalent of a single blue image pixel in the displayed image. To achieve the increased brightness in the color display from a brighter blue image, the display pixels in both the horizontal and vertical dimensions in active matrix 76 of TNLC cell 70 are larger than the display pixels in the active matrices 44, 124, and 144 of both embodiments of the red and green image forming TNLC cells 40, 120, and 140. The blue image thus has an increased space-average intensity (luminance) over the red and green image, through a reduction in overall sampling density, or image resolution. Preferably, the overall reduced sampling density of active matrix 76 is in the range of one-half to one-fourth that of the active matrix for a red and green image forming cell. Research relating the characteristics of human spatial sensitivity to different wavelength light energy suggests that a lower image resolution for the blue image component in the range of from one-half to one-quarter the image resolution of the red plus green image component is roughly proportional to the eye's respective peak spatial frequency responses to blue light and red or green light. It will be appreciated by those skilled in the art that other reductions in overall pixel sampling density may work effectively in particular situations to provide a suitable blue image component with increased brightness without effecting the effective resolution of the full color image. However, there will be a resolution reduction limit in a particular situation beyond which reducing the resolution of the blue image below that of the red and green image will result in reducing the effective resolution of the full color image.

In recapitulation, it has been shown that the two embodiments of the two path full color liquid crystal display of the present invention achieve the goal of improved luminous display efficiency over the two path display disclosed by Silverstein et al. by optimizing the light throughput in the red and green optical path. The highly efficient backlight described in the first embodiment of the two path display of the present invention may be used in combination with a liquid crystal light valve using a twisted nematic configuration which provides high contrast ratios, but the invention is not limited to the twisted nematic liquid crystal configuration, and may be used effectively with any type of liquid crystal display configuration. The active matrix technology used to modulate the light propagating through the display achieves response times suitable for displays having high information content, and is suitable for use in conjunction with software which displays animation or uses a pointing device. The color selection polarizers utilized in the embodiment of the display illustrated in FIG. 2 enable a single display pixel to effectively control color along the red to green colorimetric axis, such that a single display pixel is the equivalent of an image pixel in the final composite full color image. This enables a variety of display configurations to be designed to meet the luminance and resolution requirements of the particular display application.

Further, the red and green light source, the light coupling lens array, and the active matrix driving the liquid crystal display each may be fabricated independently on transparent substrates which are optimized for their respective manufacturing processes, thereby affording an opportunity to lower unit manufacturing costs for the red and green optical path over a comparably sized full color display having three optical paths.

It is therefore evident that there has been provided in accordance with the present invention, a full color liquid crystal display having two optical paths and achieving improved luminous efficiency through the use of a light coupling lens array that fully satisfies the objects, aims, and advantages hereinbefore set forth. While this invention has been described in conjunction with specific embodiments thereof, it is evident that many alternatives, modifications and variations will be apparent to those skilled in the art. Accordingly, it is intended to embrace all such alternatives, modifications and variations as fall within the scope of the appended claims.

What is claimed:

1. A liquid crystal color display for displaying a full color image comprising light source means for providing a red light component and a green light component along a first optical path, and for providing a substantially collimated blue light component along a second optical path;

first liquid crystal image forming means for receiving the red and green light from the light source means along the first optical path and for forming a red and green color image therefrom; the first liquid crystal image forming means having a plurality of individually addressable, light modulating display pixels; the plurality of light modulating display pixels having modulation means associated therewith for modulating the red and green light components according to the red and green image to be formed;

light coupling lens array means disposed only along said first optical path for optically coupling the red and green light components received along the first optical path to respective ones of the plurality of light modulating display pixels; the light coupling lens array means having optical properties to collect the red and green light components and to focus a real image thereof in the respective ones of the plurality of light modulating display pixels;

second liquid crystal image forming means for forming a blue color image; the second image forming means receiving the collimated blue light component from the light source means along the second optical path;

image combination means for receiving the red and green color image and the blue color image from the respective first and second optical paths for combining by additive spatial superposition into a composite full color image; and image display means, disposed to receive the full color image from the image combination means, for displaying the composite full color image in a manner so as to be visible to a human observer.

2. The liquid crystal color display of claim 1 wherein the light source means includes first and second light sources; the first light source having alight emitting surface and having a plurality of individual visible light emitters for providing visible red and green light to the full color display along the first optical path; the plurality of visible red and green light emitters being arranged spatially on the light emitting surface so that light from each of the visible red and green light emitters forms a mixture color to the human eye along a red to green colorimetric axis by additive spatial juxtaposition; the second light source providing the substantially collimated blue light component along the second optical path; and the light coupling lens array means is disposed between the first light source and the first image forming means; the light coupling lens array means optically coupling the visible light from each emitter to a respective one of the light modulating display pixels; the light coupling lens array means having optical properties to collect substantially all of the visible light from each emitter and to focus a real image thereof in the respective display pixel.

3. The liquid crystal color display according to claim 2 wherein the light coupling lens array means includes a two dimensional array of light conducting rod lenses, each rod lens having a graded refractive index distribution.

4. The liquid crystal color display according to claim 2 wherein the light coupling lens array means includes a plurality of two-dimensional planar arrays of lenslets, disposed adjacent to each other; each planar array of lenslets being in substantial alignment with adjacent planar arrays of lenslets.

5. The liquid crystal color display according to claim 2 wherein the light coupling lens array means includes a two-dimensional planar array of microlenses integrally formed on a transparent substrate layer, each microlens being approximately the size of one display pixel of the first image forming means; the array of microlenses being spatially arranged on the substrate layer so that one microlens is in substantial alignment with one visible light emitter and with the respective one of the display pixels of the first image forming means; each microlens having optical properties to collect substantially all of the visible light from one respectively aligned light emitter and to focus the collected light as a real image into the respective display pixel.

6. The liquid crystal color display according to claim 2 wherein the first liquid crystal image forming means further includes,
    a first linear polarizer, disposed between the first light source and the plurality of light modulating display pixels; the first linear polarizer polarizing in a first polarization plane the visible light from each emitter before the light enters each of the plurality of light modulating display pixels;
    a nematic liquid crystal material of a twisted configuration capable of causing a rotation of the first polarization plane of the visible light in each display pixel when the modulation means energizes the display pixel; and
    a second linear polarizer, disposed between the first liquid crystal image forming means and the image combination means; the second linear polarizer controlling optical transmission of the visible light modulated by the first liquid crystal image forming means, according to the rotation of the first polarization plane of the light therein.

7. The liquid crystal color display according to claim 2 wherein the image display means includes magnification means for magnifying and projecting the composite full color image onto a viewing surface.

8. The liquid crystal color display according to claim 2 wherein the image display means includes light diffusing means for displaying the composite full color image so that a human observer may view the image from on-axis and off-axis viewing angles.

9. The liquid crystal color display according to claim 2 wherein the red and green color image has a first image resolution, and wherein the blue color image has a second image resolution; the second image resolution being less than the first image resolution.

10. The liquid crystal color display according to claim 9 wherein the second image resolution of the blue color image is in a range of from one-half to one-fourth that of the first image resolution of the red and green color image.

11. The liquid crystal color display of claim 1 wherein
    the plurality of individually addressable, light modulating display pixels of the first liquid crystal image forming means controls light intensity of the red and green image; each of the plurality of pixels being selectively energized according to the red and green image to be formed, in order to modulate the light intensity of the red and green light components received along the first optical path;
    the first liquid crystal image forming means further includes liquid crystal color selection means for selecting color along a red to green colorimetric axis in each of a second plurality of individually addressable, light modulating display pixels; the liquid crystal color selection means including at least two color selecting polarizers for selecting quantities of the red and green light components emanating from each of the second plurality of display pixels according to the red and green image to be formed;
    the plurality of light modulating display pixels controlling light intensity and the liquid crystal color selection means being positioned along the first optical path such that respective ones of the plurality of individually addressable display pixels controlling light intensity are substantially aligned with respective ones of the second plurality of individually addressable display pixels selecting color along the red to green colorimetric axis; and
    the light coupling lens array means is disposed between the plurality of light modulating display pixels controlling light intensity and the liquid crystal color selection means; the light coupling lens array means collecting substantially all of the visible light from each of the plurality of light modulating display pixels controlling light intensity and focusing a real image thereof in each respectively aligned display pixel.

12. The liquid crystal color display according to claim 11 wherein the light coupling lens array means includes a two dimensional array of light conducting rod lenses, each rod lens having a graded refractive index distribution.

13. The liquid crystal color display according to claim 11 wherein the light coupling lens array means includes a plurality of two-dimensional planar arrays of lenslets; each planar array of lenslets disposed adjacent to each other and being in substantial alignment with adjacent planar arrays of lenslets.

14. The liquid crystal color display according to claim 11 wherein the light coupling lens array means includes a two-dimensional planar array of microlenses integrally formed on a transparent substrate layer, each microlens being approximately the size of one display pixel of the plurality of light modulating display pixels controlling light intensity; the array of microlenses being spatially arranged on the substrate layer so that each microlens is in substantial alignment with one display pixel of the plurality of light modulating display pixels controlling light intensity and with one respectively aligned display pixel of the liquid crystal color selection means; each microlens having optical properties to collect substantially all of the visible light from one display pixel of the plurality of light modulating display pixels controlling light intensity and to focus the collected light as a real image into the respectively aligned display pixel of the liquid crystal color selection means.

15. The liquid crystal color display according to claim 11,
    wherein the first liquid crystal image forming means further includes a linear polarizer for polarizing the red and green light components in a first polarization orientation before the red and green light components enter the plurality of light modulating display pixels controlling light intensity;

wherein the liquid crystal color selection means includes a nematic liquid crystal material of a twisted configuration for forming the red and green image in the second plurality of individually addressable display pixels, the nematic liquid crystal material being capable of causing a rotation of the first polarization orientation of the visible light in each display pixel to a second polarization orientation when the modulation means energizes the display pixel;

and wherein the at least two color selecting polarizers include, a first color selecting linear polarizer for selecting red light; the first color selecting linear polarizer transmitting the red light component polarized in the second polarization orientation, absorbing the green light component polarized in the second polarization orientation, and transmitting the red and green light components polarized in the first polarization orientation; and a second linear color selecting polarizer for selecting green light; the second color selecting linear polarizer transmitting the green light component polarized in the first polarization orientation, absorbing the red light component polarized in the first polarization orientation, and transmitting the red and green light components polarized in the second polarization orientation.

16. The liquid crystal color display according to claim 11 wherein the image display means includes magnification means for magnifying and projecting the composite full color image onto a viewing surface.

17. The liquid crystal color display according to claim 11 wherein the image display means includes light diffusing means for displaying the composite full color image so that a human observer may view the image from on-axis and off-axis viewing angles.

18. The liquid crystal color display according to claim 11 wherein the red and green color image has a first image resolution, and wherein the blue color image has a second image resolution; the second image resolution being less than the first image resolution.

19. The liquid crystal color display according to claim 18 wherein the second image resolution of the blue color image is in a range of from one-half to one-fourth that of the first image resolution of the red and green color image.

* * * * *